No. 641,798. Patented Jan. 23, 1900.
J. H. REYNOLDS.
MECHANISM FOR MANUFACTURING DECKLE-EDGE PAPER.
(Application filed May 20, 1899.)
(No Model.)
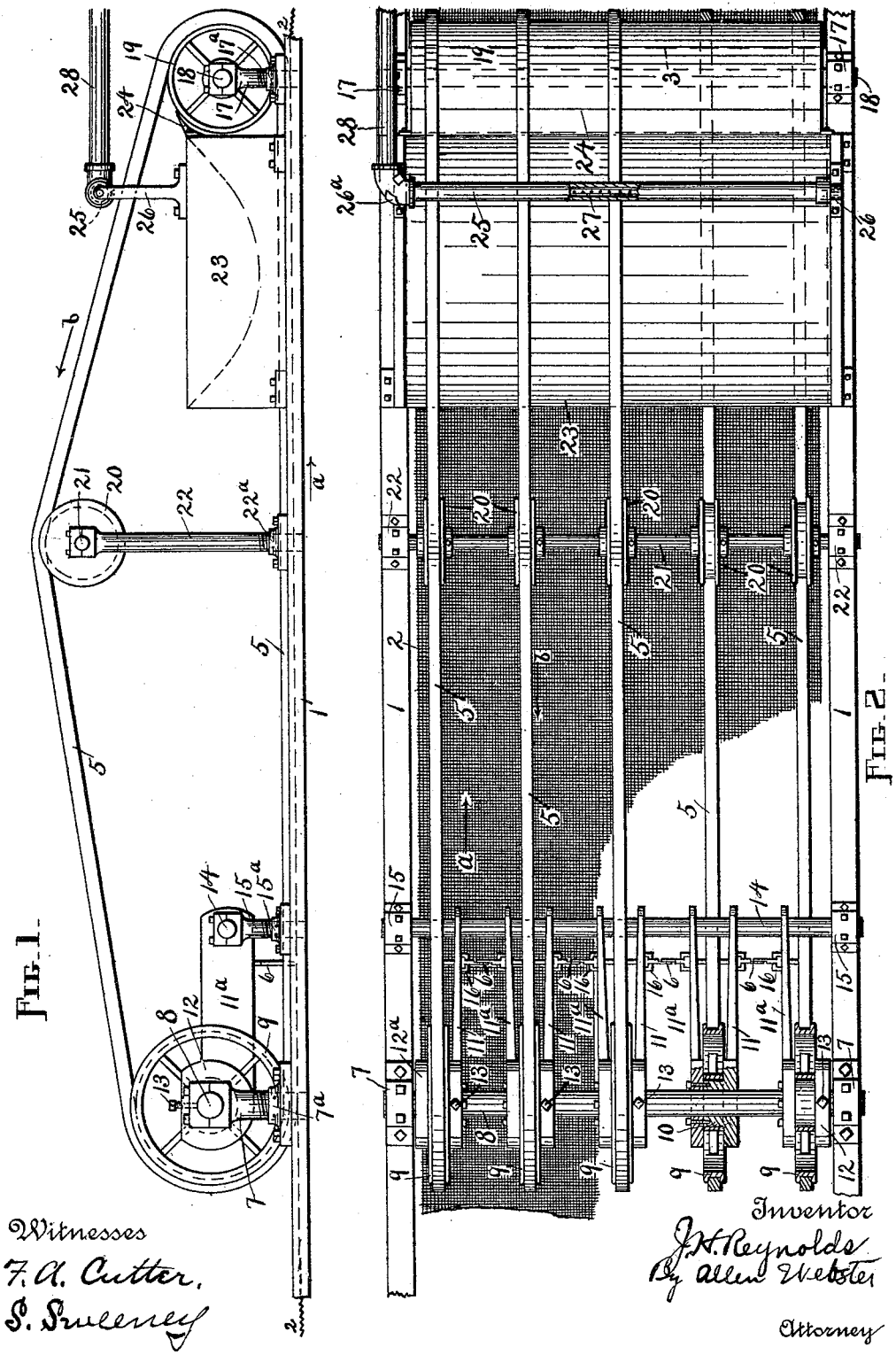

UNITED STATES PATENT OFFICE.

JAMES H. REYNOLDS, OF MITTINEAGUE, MASSACHUSETTS.

MECHANISM FOR MANUFACTURING DECKLE-EDGE PAPER.

SPECIFICATION forming part of Letters Patent No. 641,798, dated January 23, 1900.

Application filed May 20, 1899. Serial No. 717,588. (No model.)

*To all whom it may concern:*

Be it known that I, JAMES H. REYNOLDS, a subject of Her Majesty the Queen of Great Britain, residing at Mittineague, in the county of Hampden and State of Massachusetts, have invented new and useful Mechanism for Manufacturing Deckle-Edge Paper, of which the following is a specification.

My invention relates to improvements in those parts of paper-making machinery which are employed in producing feather or deckle edges on the paper; and the objects of my improvement are, first, to provide a much lighter and more easily adjustible mechanism for the purpose specified above than has been used heretofore; second, to afford facilities for manufacturing either deckle or plain edge papers in a plurality of continuous strips or sheets instead of only a single sheet; third, to insure a saving of time in adjusting the mechanism, and, fourth, to augment the cleanliness of the process. I attain these objects by the mechanism illustrated in the accompanying drawings, in which—

Figure 1 is a side view of my invention; and Fig. 2, a plan view, in partial section, of the same.

Similar figures refer to similar parts throughout both views.

Sections of an ordinary vibrating frame, sufficient to give a clear understanding of the device, are shown in the accompanying drawings. The endless-wire carrier or fourdrinier 2 is common to paper machinery and is supported upon suitable rollers mounted in a paper-machine in the usual and well-known manner, the carrier being driven in the direction indicated by the arrow $a$ by the application of power in the common way. The fourdrinier, deckle-straps 5, and slices are old in the art; but the mechanism about to be described is new.

At the left of the frame 1 are the brackets 7 7, which carry the shaft 8 for the five deckle-pulleys 9 and connections. Each pulley 9 is loose on the sleeve 10, which is integral with the slice-carrier 11 and has the companion carrier $11^a$ bolted or otherwise rigidly secured thereto, said carriers and the intermediate sleeve resting directly on the shaft 8. In place of the carriers 11 and $11^a$ outside of the two end pulleys 9 are the blocks 12 and $12^a$, no carriers being required at those points.

The block 12 and the carriers 11 are provided with set-screws 13 to bear on the shaft 8 and prevent the pulleys 9 from being moved laterally, except when said set-screws are loosened. The right-hand ends of the slice-carriers 11 and $11^a$ are supported by a secondary shaft 14, bearing in the brackets 15 15 on the frame 1. The face of each of the carriers 11 and $11^a$ is equipped with the holder 16 to receive one end of a slice 6. Each slice 6 consists of two or more parts adjustably connected, so that said slice can be lengthened or shortened, and the same is capable of being raised or lowered in the holders 16.

At the right of the frame 1 are the brackets 17 17, which carry the shaft 18 for the drum 19. The five endless deckle-straps 5 pass around the pulleys 9 and the drum 19 and over the idler-pulleys 20 on the shaft 21, which is journaled in the brackets 22 22. The pulleys 20 are provided with collars and set-screws passing through the latter to bear on the shaft 21, whereby said pulleys are rendered laterally adjustable on said shaft.

The brackets 7, 15, 22, and 17 are so constructed as to be vertically adjustable either by means of the threaded collars $7^a$, $15^a$, $22^a$, and $17^a$, the shanks of said brackets being threaded and adapted to engage in threaded sockets or openings in the frame 1 or through any other desirable medium.

Two of the pulleys 9 and portions of their connections are shown in section, the upper reaches of the corresponding straps 5 being omitted, and the carrier 2 is partially broken away in Fig. 2.

The drip-tank 23 is supported on the frame 1 at the left of the drum 19 between the upper and lower reaches of the deckle-straps 5, and the scraper or "doctor" 24 extends from the right edge of said tank onto said drum. A pipe 25 is supported over the tank 23 by the standards 26 and $26^a$ or some other suitable means, and said pipe is provided with perforations 27, as shown in the broken portion, Fig. 2. Water is conveyed to the pipe 25 through the pipe 28 from some source of supply.

It is obvious that more or less than five deckle pulleys and straps, with associated members, may be employed and minor changes made in the arrangement and construction of the several parts without departing from the nature of my invention. If desired, more than one shaft 21, with its idler-pulleys, may be made use of.

The operation of my mechanism is as follows: The set-screws 13 are first loosened to allow the several pulleys 9 and slice-carriers 11 and 11ª to be adjusted on the shaft 8 to determine the desired width of the four bands or continuous sheets of paper which this mechanism is capable of handling, and then said set-screws are again tightened. The vertical adjustment of the several shafts is attended to and the revoluble parts set in motion. Contact between the upper reach of the moving wire-carrier 2 and the lower reaches of the straps 5 drives the latter in the direction of the arrow $b$, and said straps act upon the edges of the paper, which freshly forms as the pulp on said carrier passes beneath the slices 6, producing either a deckle or plain edge, according to the adjustment given the strap-carrying members. The adjustment mentioned above is for the purpose of separating the straps from the carrier sufficiently to allow particles or shreds of the pulpy paper to ooze between the adjacent moving members and produce what is called "deckle edges," on the one hand, and to bring said members so close together, on the other hand, as to prevent feathering the edges. While this mechanism is constructed especially for making deckle-edge paper, its practicability for manufacturing ordinary paper is not impaired thereby.

As intimated before, the pulp at the left of the slices 6 is divided into four continuous sheets of paper by the straps 5, when it emerges from beneath said slices and passes under the tank 23 and the drum 19 into another section of the machinery. During the progress of the paper between the straps 5 more or less shreds adhere to the same and stick to the drum 19, and it is very essential that said straps should be thoroughly cleaned at least once in the course of each circuit thereof.

To facilitate the cleansing of the straps, it is desirable to keep the drum 19 clear, and I employ the doctor 24 for this purpose, which constantly scrapes the particles from said drum when in motion and precipitates them into the tank 23. The straps themselves are cleansed directly by means of water constantly flowing over the same from the perforated pipe 25. The water from the pipe 25 washes all shreds and particles from the straps into the tank 23.

It will be particularly noted that one of the principal advantages of my mechanism over all others lies in the fact that more than one continuous sheet can be run through at the same time, an advantage which greatly enhances the capacity of my invention in the production of narrow deckle-edge paper.

I do not claim, broadly, those parts that are hereinbefore specified as old; but What I do claim as my invention, and desire to secure by Letters Patent, is—

1. In a paper-making machine, of the character described, the combination with the wire-cloth and a suitable supporting-frame, of a shaft mounted across the frame, sleeves mounted on the shaft, pulleys loosely mounted on the sleeves, collars on the sleeves to retain the pulleys on their bearings, a drum remote from the pulleys, and deckle-straps connecting the pulleys and the drum.

2. In a paper-making machine of the character described, the combination with the wire-cloth and a suitable supporting-frame, of a shaft mounted across the frame, sleeves mounted on the shaft having slice-carriers projecting therefrom, pulleys on the sleeves, collars detachably secured to the sleeves to secure the pulleys thereon and having slice-carriers projecting therefrom, slices secured to the slice-carriers, and a shaft to support the free ends of the slice-carriers, a drum journaled in the frame, and deckle-straps about the pulleys and drum.

3. In a paper-making machine of the character described, the combination with the wire-cloth and a suitable supporting-frame, of a shaft mounted across the frame, sleeves mounted on the shaft each having a slice-carrier projecting from one end thereof, loose pulleys on the sleeves, a retaining-collar on each sleeve to hold the pulleys thereon and having a slice-carrier projecting therefrom, a slice carried by the slice-carriers, a drum journaled on the frame remote from said pulleys, a shaft mounted intermediate of the said pulleys and the drum, pulleys on the intermediate shaft, and deckle-straps about the pulleys and the drum and over the pulleys on the intermediate shaft.

4. The combination in mechanism for manufacturing paper, of two shafts, a sleeve on one of the shafts, two slice-carriers on the sleeve, and a deckle-pulley mounted on said sleeve, the whole arranged to be laterally adjusted on the shafts, substantially as set forth.

5. The combination in mechanism for manufacturing paper, of two shafts, a sleeve on one of the shafts, a slice-carrier and a block on the sleeve, said carrier being mounted on both of said shafts and said block on one of the same, and a deckle-pulley mounted on said sleeve, the whole being arranged to be laterally adjusted on said shafts, substantially as set forth.

6. In a paper-making machine, the combination with the deckle-straps and the drum on which they are arranged, of a water-tank disposed across the machine between the upper and lower stretches of the straps, a perforated water-pipe transversely across the machine above the upper stretch of the said straps, and a scraper secured to the water-tank and engaging with the perimeter of the drum, substantially as described and shown.

JAS. H. REYNOLDS.

Witnesses:
F. A. CUTTER,
STASIA SWEENEY.